Figure 1:
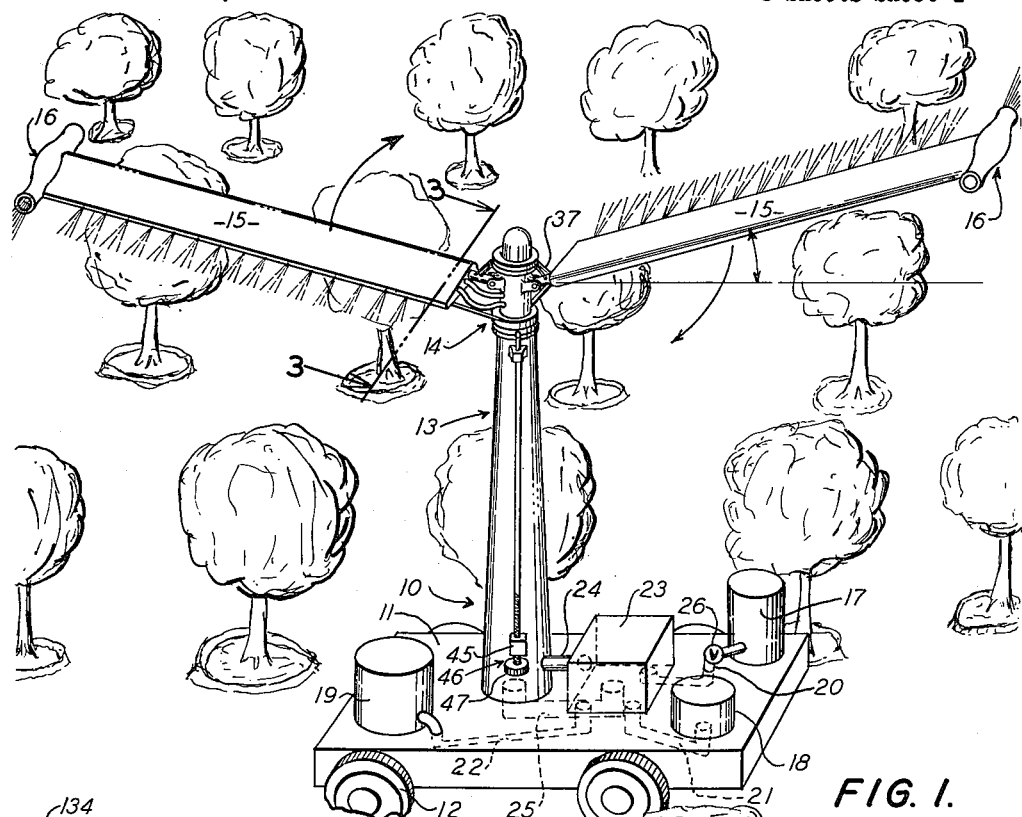

Dec. 11, 1962 H. W. SMITH 3,067,541
AGRICULTURAL METHOD AND APPARATUS FOR
HEATING, TREATING, AND
CIRCULATING AIR
Filed Oct. 10, 1960 3 Sheets-Sheet 2
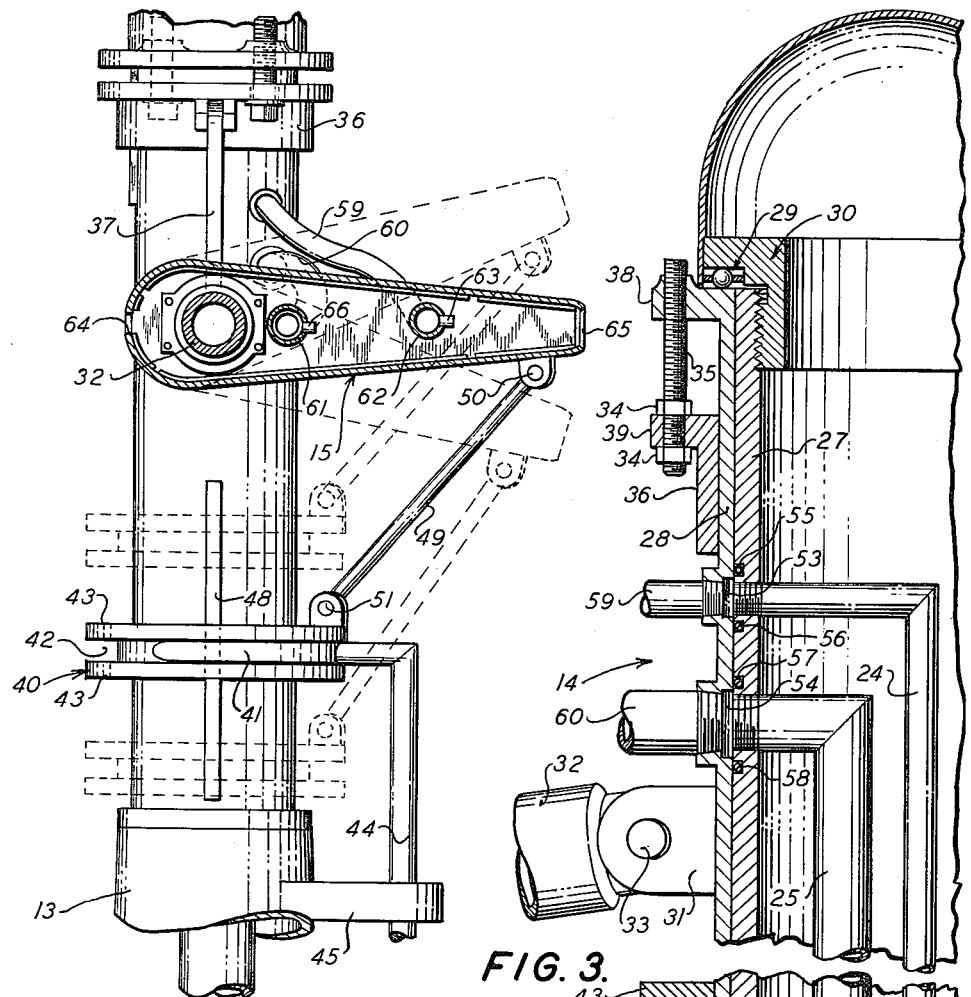
FIG. 2.
FIG. 3.
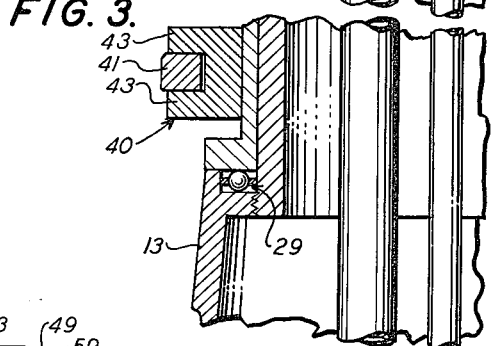
FIG. 4.
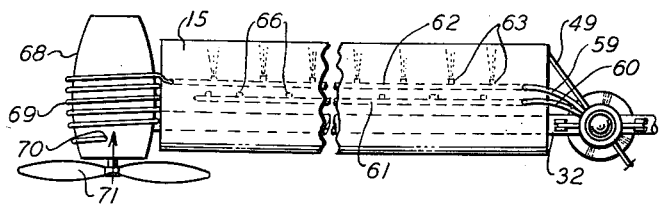
INVENTOR.
HAROLD W. SMITH
BY
ATTORNEYS

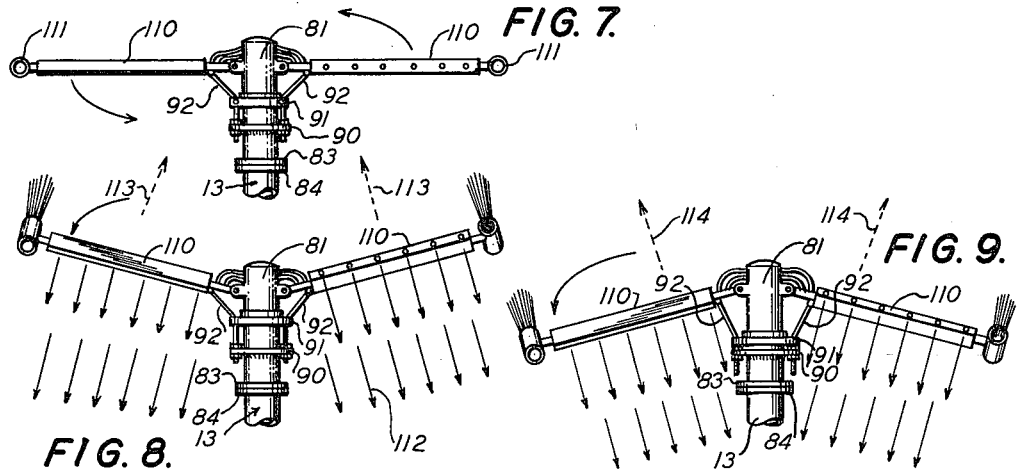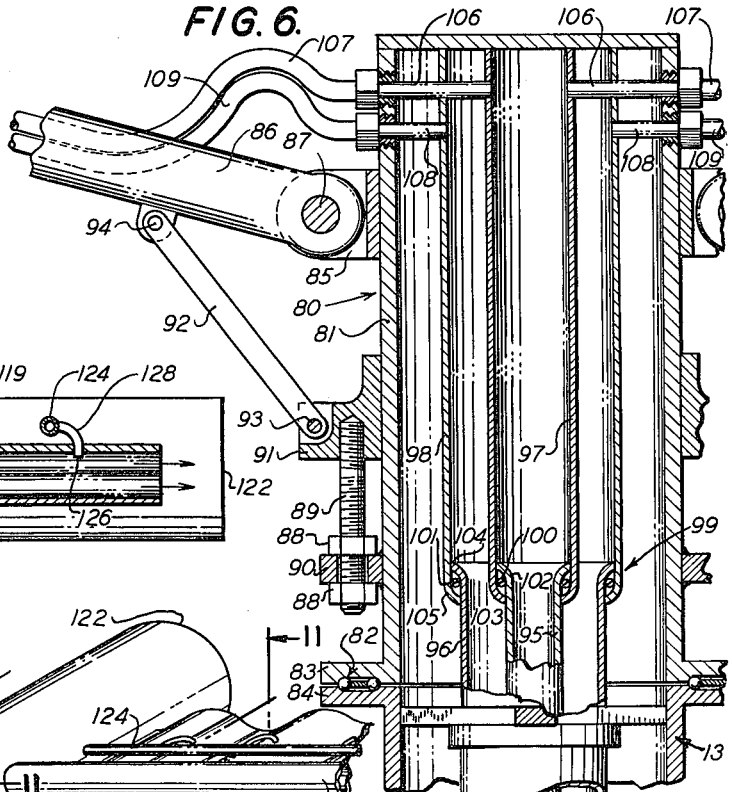

United States Patent Office 3,067,541
Patented Dec. 11, 1962

3,067,541
AGRICULTURAL METHOD AND APPARATUS FOR HEATING, TREATING, AND CIRCULATING AIR
Harold W. Smith, San Marino, Calif., assignor, by mesne assignments to American Liquid Gas Corporation, a corporation of California
Filed Oct. 10, 1960, Ser. No. 61,726
15 Claims. (Cl. 47—2)

This invention relates generally to methods and apparatus for rapidly treating relatively large environmental areas proximately above the earth. More particularly the invention has to do with the dispersal over wide areas of particulate matter such as water droplets or mist, chemicals including insecticides and fertilizers, fog dispersal substances, smoke and the like, and also heating of environmental areas as by radiation, and also conduction of heat to air being blown or displaced over such areas.

The invention is directed primarily to the provision and use of relatively large, bladed rotor structure adapted to be supported for rotation above the earth at a work site, the rotor structure being operable to displace air vertically above a localized section of the earth so that the displaced air becomes widely dispersed above that section. The novel assembly, including the rotor structure, is provided with duct means for feeding fuel and treatment fluid, powder, particles, etc., to a rotor blade or blades ultimately to discharge into the air being circulated, the treatment fluid for example comprising water, aqueous insecticide or fertilizer, smoke, fog dispersal materials, and even fuel. Typically, the bladed rotor structure includes duct means extending along the lengths of the blades, and provided with discharge orifices through which the treatment fluid is discharged to enter the air being circulated, and thereby widely dispersed over the environmental area. Fuel discharged through the duct orifices may be burned to heat the rotor blade means, for example as the combustion products travel within the blades and escape into the external circulating air, for heating the latter both by mixing of the hot combustion products with the air and also by conduction as the air passes over and in contact with the heated blades. Furthermore, the blades radiate heat downwardly toward the environmental ground areas typically for frost prevention in agricultural areas as for example orchards, crops, vegetable areas, flower beds, etc.

Another aspect of the invention has to do with the control of air circulation both upwardly and downwardly in relation to the environmental area, as for example an agricultural section. In the latter instance, the bladed rotary means is controlled to circulate any warm air existing above the ground downwardly and outwardly or transversely so that particulate matter such as chemicals, insecticides, water particles and the like may be carried into intimate contact with plant life over a large area. Thus, for example, water particles may be discharged into the air from the bladed rotor means which is itself heated, with the result that the water particles are carried into contact with plant life and ground surface which is heated by radiation from the blades and also by warmed air circulation thereover, all for the purpose of keeping the temperature of the plant surfaces above the frost point. In this regard, a condition approaching moisture saturation may be created in the plant and ground surface environmental area, thereby to prevent evaporation of the moisture from the plant surfaces, which would otherwise drop the temperature of the plant below the frost point. The same bladed rotary means may also be used for distributing water for irrigation purposes, fertilizing and pest control, so that great economies may be realized in farming through the use of fluid dispensing and/or heat distributing rotor blade apparatus for achieving these different purposes.

It is a particular object of the invention to provide a novel bladed and ducted rotary apparatus powered by liquified petroleum gas fuel, or other fuel, as by the provision of fuel ducts extending through or along the rotor blades to jet propulsion units located or carried on or near the ends of the blades, the latter jets being arranged to drive the rotor. Thus, the rotor assembly may be constructed very simply and efficiently, obviating any need for a heavy internal combustion engine to be carried by the rotor or driving the rotor through complex gearing or transmission elements.

These and other objects and advantages of the invention will be further understood from the following detailed description of the drawings in which:

FIG. 1 illustrates the use of a typical bladed rotor apparatus of the invention in an agricultural environment;

FIG. 2 is an elevation, partly in section, showing the rotor head and the controls for the rotor blades;

FIG. 3 is an enlarged fragmentary vertical section taken through the rotor head of FIG. 2;

FIG. 4 is a plan view of the FIG. 1 blade with a modified jet engine construction;

FIG. 5 shows the FIG. 1 jet engine construction;

FIG. 6 is a vertical section through a modified rotor head;

FIG. 7 shows the FIG. 6 rotor head with blades extended horizontally;

FIG. 8 shows the FIG. 6 rotor head with blades tilted upwardly;

FIG. 9 shows the FIG. 6 rotor head with blades tilted downwardly;

FIG. 10 is a perspective showing of a still further modified blade and jet engine construction;

FIG. 11 is a section taken on line 11—11 of FIG. 10; and,

FIG. 12 is a perspective showing of a modified bladed rotor apparatus and treatment fluid dispensing means.

Referring first to FIG. 1, a portable assembly is shown at 10 to include a vehicle 11 which may typically but not necessarily be supported on wheels 12 and located within an agricultural environment such as an orchard as shown. The vehicle 11 may be moved to any desired location within the orchard so that the apparatus carried by the vehicle may be utilized for treating the chosen environmental area which is typically quite large.

One form of such apparatus is shown to include a column 13 supporting a rotor head 14 which carries blades 15 and jet engines 16, the latter typically being located at or near outward extremities of the blades. The rotor head 14 and the blades 15 may be referred to as bladed rotor means and it will be understood that one or more blades may be utilized, although at least two blades are preferable for balance purposes.

The vehicle 11 also carries suitable means for supplying fuel and treatment fluid to the rotor structure, and for purposes of illustration there is shown a fuel tank 17, a water tank 18 and a chemical tank 19. The fuel may typically but not necessarily comprise liquid petroleum gas such as propane or butane, and the chemicals may typically comprise one or more insecticides, fertilizer such as ammonium compounds, or other materials. For purposes of supplying these materials to the rotor head structure, supply lines 20, 21 and 22 are shown leading from the tanks 17 to 19 respectively, to a pumping and flow control unit shown at 23, control valves not shown being set to deliver the desired quantities of fuel, water and chemicals to the rotor head and blades. Merely for purposes of illustration, supply lines are shown at 24 and 25 leading into the base of the column 13, and FIG. 3 shows the vertical upward terminals of the conduits 24 and 25 within the rotor head 14. Typically, but not necessarily, fuel may be supplied through the line or conduit 24 whereas water or chemicals or mixtures thereof may be supplied through the line 25, as governed by the control 23. In the case where the fuel comprises liquified petroleum gas, a suitable regulator is provided in the line 20 as for example at 26, between the tank 17 and the control 23.

Referring now to FIG. 3 the rotor head is shown to comprise a nonrotary tube 27 supported by the column 13 and a rotary sleeve 28 carried by the tube 27 and axially positioned between vertically spaced bearings 29, the upper bearing being carried by a cap assembly 30 mounted on the tube 27. The sleeve 28 mounts a pair of supports 31 to which the blades 15 are connected for up and down hinging movement. Thus, the blade spars 32 may be connected to the supports as by horizontal hinge pins 33 extending through the supports and the spars. Such vertical hinging of the blades is controlled by adjustment of nuts 34 on a screw 35 to lift or lower a vertically floating ring 36 with respect to mounting sleeve 28. The ring 36 is connected to the blade spars by links 37, as seen in FIG. 2, so that as the ring 36 is lifted the blades will be swung upwardly, whereas lowering of the ring 36 swings the blades downwardly about the hinge pins 33. FIG. 3 also shows the screw 35 connected to a flange 38 on the sleeve 28 and the nuts 34 spaced at vertically opposite sides of a flange 39 on the ring 36.

Tilting of the blades 15 about the lengthwise axes of the spars 32 is controlled by vertical displacement of a ring 40 floating vertically on the sleeve 28, as shown at FIGS. 2 and 3. Such vertical displacement is in turn controlled by vertical adjustment of a fork 41 projecting into an annular recess 42 between upper and lower flanges 43 on the ring 40. The fork is in turn connected with a vertical rod 44 extending downwardly through a support 45 on the column 13 and to a hand control 46 shown in FIG. 1. Rotation of the hand wheel 47 serves to lift and lower the ring 40.

The latter is keyed to the rotary sleeve 28 as shown at 48 so that the ring 40 rotates with the sleeve 28 and with the blades. Accordingly, tilting of the blades may be controlled by interconnecting the ring 40 with the trailing portions of the blades as through the links 49, and joints 50 and 51. Therefore, should it be desired to displace downwardly more air for delivery to the environmental area, the ring 40 may be moved downwardly to increase the angle of attack of the blade 15; and, should it be desired to direct more air transversely outwardly, it is only necessary to raise the ring 39 to tilt thereby the blades to extend upwardly and outwardly.

FIGURES 3 and 4 show the manner in which fuel and treatment fluid may be delivered to and through the blades 15 while they are rotating. Thus, the fuel line 24 terminates at an annular recess 53 formed in the bore of the sleeve 28, whereas the line 25 terminates at a corresponding recess 54 in the sleeve. O-ring seals 55 through 58 may be provided at vertical intervals to seal off between the tube 27 and sleeve 28, whereby fuel and treatment fluid delivered to the recesses 53 and 54 may be supplied during rotation of the sleeve to rotating flexible conduits 59 and 60 extending into each blade 15.

Extensions of such conduits are shown at 61 and 62 running lengthwise through and within the blades, as better seen in FIGS. 3 and 4, and it will be understood that one or both of these conduits may be provided with discharge orifices spaced along the conduit lengths for discharging fuel or treatment fluid. Thus, fuel conduit orifices are shown at 63 discharging rearwardly toward the trailing edge of the blade 15, whereby fuel discharged within the blade structure may be burned for heating the latter. Combustion air enters the blades as through suitable ports 64 located at the forward edge of the blade, and such air serves to support combustion of the burner gas, the products of combustion leaving the trailing edge of the blades as through ports 65. Thus, the blades are heated for transferring and widely distributing heat to the agricultural environment, and the heated products of combustion are dispersed within the circulating air for heating plant life.

Discharge orifices 66 are shown at lengthwise spaced intervals along the conduit 61 for the purpose of distributing water, chemicals or any other desired fluidized or powdered treatment substances into the air stream flowing through the blade and discharging through ports 65 into the vertically displaced air being carried downwardly to the plants. It may be desired to circulate fuel through both of the conduits 61 and 62, in which case more heat may be distributed to the agricultural environment by radiation and conduction.

FIG. 4 shows conduit 62 extended beyond the outer end of the plate 15 to encircle the housing of a turbo-jet engine 68, the conduit extension being shown in the form of a coil 69. The latter terminates at 70 for delivering fuel to the jet engine for driving the propeller 71, and the coil 69 serves the purpose of picking up heat from the engine for assuring complete vaporization of the fuel supplied to the engine jet or for combustion purposes.

FIG. 5 shows the FIG. 1 simple jet engine 16 having venturi sections 73 and 74. Fuel is supplied through a conduit 75 to a coil 76 wrapped around the combustion chamber of the engine 72 and discharging at 77 into the forward venturi section 73. Air enters the intake 78 and products of combustion leave the engine at 79 in a jet providing thrust. It will be understood that the engine 72 may be carried at the outer extremity of each wing or blade 15 and that the conduit 75 extends lengthwise along or through the blade and communicates with the fuel supply.

Referring now to FIG. 6, the modified form of rotor head shown at 80 includes a rotary housing 81 supported for rotation on the column 13 as by bearings 82 interposed between flanges 83 and 84 of the housing 81 and column 13. The housing also supports members 85 to which the blade spars 86 are hinged as by pins 87 for up and down swinging movement of the blades. Such movement is controlled by adjusting the positions of upper and lower nuts 88 on a bolt 89, which extends between the flange 90 joined to the housing 81, and a ring 91 which is free to float up and down upon the housing 81. Such controlled ring motion is transmitted to the blade spars 86 by links 92 hinged at 93 to the ring 91, and hinged at 94 to the spars 86.

Fuel and other fluid, such as treatment fluid, are respectively delivered upwardly through concentric tubing 95 and 96 which does not rotate, and to concentric tubing 97 and 98 which rotates with the housing 81. The fuel and other fluid thus passes upwardly through a rotary joint 99 which may have the form shown or any other suitable form serving the function of sealing off between the lower and upper tubes which are respectively stationary and rotary. As shown in FIG. 6, O-ring seals 100 and 101 are provided between flaring extents 102 through 105 of the different tubes.

Fuel in the upper rotary tube 97 is delivered to the blades through suitable conduits 106 and 107, the former being connected into the tube 97 and the latter extending outside the housing and into the blades typically in the manner described in connection with FIG. 2. Likewise, treatment fluid within the concentric outer rotary tube 98 is delivered to the blades through conduits 108 and 109, the former connecting into the tube 98, and the latter extending outside the housing 81.

FIG. 7 shows the rotor head assembly of FIG. 6 with the blades 110 thereof extending horizontally, jet engines 111 being located at the outer ends of the blades. FIG. 8 shows the same rotor head assembly with the blades tilted upwardly about the axes of the pins 87 so that air flow and dispersed fluid is circulated downwardly and transversely outwardly in the direction of the arrows 112.

Such circulation occurs with the blades having positive angles of attack; however, should the blades have negative angles of attack the air flow and dispensed fluid will be circulated upwardly and concentrated transversely inwardly toward axis of the rotor head assembly, in the directions of the arrows 113. FIG. 9 shows the same rotor head assembly with the blades 110 swung downwardly so that flow is circulated downwardly and concentrated transversely inwardly toward the axis of the rotor head assembly with the blades having positive angles of attack. Conversely, should the blades have negative angles of attack, the flow will be circulated upwardly and transversely outwardly in the directions of the arrows 114. The latter configuration would be useful in the event the rotor head assembly were to be used for dispersing a smoke screen in military environments and also for dispersing fog above an area such as an airport.

Referring now to FIGS. 10 and 11, a greatly simplified blade configuration is shown to comprise upper and lower corrugated metal sheets 115 and 116, the corrugations of which meet at locations 117 to form forwardly and rearwardly extending open channels 118. The sheets may be bonded at the locations 117 and may be supported by a spar 119 extending lengthwise of the blade assembly. At the outer end of the spar is located a jet propulsion unit 120 having air entrance end 121 and a rearward jet end 122.

Conduits 123 and 124 extend lengthwise of the blade assembly parallel to the spar 119, and above the corrugated sheets as shown for delivering fuel and treatment fluid to outlets or orifices 125 and 126 spaced at intervals along the blade. Thus, for example, fuel delivered through conduit 123 discharges through elbows 127 and outlets 125 into the channels 118 formed between the upper and lower corrugated sheets, and such fuel may be burned with air entering the channels to heat the corrugated sheets. Similarly, treatment fluid such as fertilizer, insecticides, etc. may be delivered from conduit 124 through elbows 128 and discharge outlets 126 into the channels 118 for dispensation therethrough into the circulating air. If desired, fuel may be supplied to the jet engine through the spar 119 or through the conduit 123.

In FIG. 12, a simplified assembly is shown to comprise a stand or column 130 supporting a rotary head 131 which carries rotary blades 132, the blade spars 133 being fixedly attached to the head 131. Jet engine units 134 are carried at the outer ends of the blades, and fuel is delivered to these units from supply tank 135, through control unit 136, pump 137, stationary duct 138, through a rotary joint 139 within the column, and through ducts within the blade spars. Such fuel may comprise liquefied petroleum gas, the joint 139 may comprise a commercial "Chicksand" joint, and the blades themselves may comprise sheet metal, or corrugated metal as in FIG. 10. In the latter event, fuel burners may be provided in the blade corrugation channels, for heating the blades.

Treatment fluid such as water, insecticide, fertilizer, etc. is supplied from a tank 140 through valve 141, pump 142 to a duct 143. The latter has a discharge end 144 directed upwardly, as for example near the free inward ends of the blade spars, for discharging treatment fluid in a mist into the air circulated upwardly or downwardly by the blades, so as to be dispersed and carried into intimate contact with the ground or plant life in the case where the apparatus is used for agricultural purposes.

If the fuel in tank 135 is sufficiently pressurized, such pressure may be used in place of a pump to urge other materials into the circulated air. For example, the fuel pressure may be applied to treatment fluid or powder in tank 150 by opening valves 151 and 152 in line 153 which connects into either of conduits 138 and 143. Also, the fuel pressure may be passed through an aspirating venturi section 154 by opening valves 155 and 156 in line 157 which connects into either of conduits 138 and 143. Treatment fluid or powder in tank 158 is then sucked into line 157 through supply line 159, communicating between tank 158 and the venturi section.

A military application of the different forms of apparatus described in the drawings would be to discharge finely divided metallic particles, such as aluminum foil particles, in natural state or carried in a suitable fluid such as water into the circulating air. The environmental atmosphere or water body near the apparatus would then become sufficiently saturated with the metallic particles to counteract the effectiveness of radar, proximity fuses and other sensing devices, both for use in the air and under water. Also, the apparatus could be used in chemical warfare to widely distribute lethal chemicals.

The invention is also applicable to the dispersing of fog and preventing fog formation in a selected atmosphere environmental zone. For example, the treatment particles discharged into the air being displaced by the bladed rotor apparatus may comprise particles characterized as acting to reduce the surface tension of minute moisture particles suspended within the selected zone. As a result, larger unsuspended particles will tend to form and settle out of the zone, preventing or clearing away fog.

Such treatment particles may comprise larger water particles, or minute silver iodide salt crystals by themselves or carried in water particles being discharged into the air.

Finally, the treatment fluids may comprise a poisonous substance such as DDT in aqueous solution, or a repellant material having a strong odor or other characteristic objectionable to animals, for example swarms of birds or insects on airport runways, which are hazardous to aircraft.

I claim:

1. The method of rapidly treating a relatively large environmental area proximately above the earth, that includes vertically displacing air above a localized section of the earth so that the displaced air becomes widely dispersed above said section by rotating bladed rotor means about a substantially vertical axis and in overlying proximity to said section, discharging treatment particles into the air lengthwise of the rotor blade and being so displaced for particle dispersal, and controlling rotor blade angularity with respect to said axis thereby producing a selected transverse flow pattern of vertically displaced air flow and said particles therein.

2. The method of preventing frost formation on vegetation in a relatively large agricultural environmental area, that includes vertically displacing air generally downwardly above a localized section of the earth so that the displaced air flows downwardly and transversely sidewardly and becomes widely dispersed over said area by rotating bladed rotor means about a substantially vertical axis and in overlying proximity to said localized section, heating said bladed rotor means so that heat is transferred toward said area, discharging water particles into the air being displaced for dispersal thereby into contact with said vegetation, and controlling rotor blade angularity with respect to said axis thereby producing a selected transverse flow pattern of vertically displaced air flow and said particles therein.

3. The method of chemically treating a relatively large agricultural environmental area containing vegetation that includes vertically displacing air generally downwardly above a localized section of the earth so that the displaced air flows downwardly and transversely sidewardly and becomes widely dispersed over said area by rotating bladed rotor means about a substantially vertical axis and in overlying proximity to said localized section, discharging chemical treatment particles into the air lengthwise of the rotor blade and being displaced for particle dispersal into contact with said vegetation, and controlling rotor blade angularity with respect to said axis thereby producing a selected transverse flow pattern of vertically displaced air flow and said particles therein.

4. Apparatus of the character described, comprising an assembly including a relatively large bladed rotor structure supported for rotation above the earth at a work site so that the axis of blade rotation is substantially vertical, said rotor structure having blade means operable to circulate air vertically above and over the earth, said assembly including duct means through which treatment material travels ultimately to discharge into the air lengthwise of said blade means and being circulated by said rotor structure, said blading having controllable angularity to produce a selected transverse flow pattern of vertically displaced air flow and said material therein.

5. Apparatus of the character described, comprising an assembly including a relatively large rotor structure adapted to be supported for rotation above the earth at a work site, said rotor structure having blade means operable to circulate air vertically above and over the earth, said rotor structure including engine means having a jet exhaust orifice and adapted to travel in a circle about the axis of rotor rotation, and said assembly including duct means for flowing fuel to said engine means and through which treatment fluid is flowable ultimately to discharge into the air being circulated by said rotor structure, said duct means having dispersing outlets spaced along the length of the blade means.

6. The invention as defined in claim 5 in which said duct means include different ducts for circulating fuel and treatment fluid in separate streams along said blade means.

7. The invention as defined in claim 6 in which said rotor structure includes a central rotary bearing supporting said blade means, and a vertical column supporting said central bearing, said duct means including conduits within said column and said central rotary bearing for circulating fuel and treatment fluid therein in separate streams, said conduits comprising inner and outer non-rotary lower conduits and inner and outer rotary upper conduits rotatable with and within said bearing, said upper and lower inner conduits being in inter-communication through a sealed rotary joint and said upper and lower outer conduits also being in inter-communication through a sealed rotary joint.

8. The invention as defined in claim 6 including a source of liquified petroleum gas fuel in communication with said fuel duct means.

9. The invention as defined in claim 6 in which said blade means contain air channels with which said dispensing outlets communicate, said channels having air inlets and outlets for circulating air through said channels in response to blade rotation.

10. The invention as defined in claim 9 in which certain of said dispensing outlets comprise fuel burners.

11. The invention as defined in claim 9 in which said air channels are spaced in series lengthwise of the blade and extend chordwise of the blade.

12. The invention as defined in claim 11 in which each blade includes at least one corrugated metal sheet the corrugations of which form said channels.

13. The invention as defined in claim 9 in which said rotor structure includes means for holding said blade means to extend lengthwise at selected angularity with respect to horizontal.

14. The invention as defined in claim 9 in which said rotor structure includes means for holding said blade means to extend chordwise at selected angularity with respect to horizontal.

15. The method of rapidly treating a relatively large environmental area proximately above the earth, that includes vertically displacing air above a localized section of the earth so that the displaced air becomes widely dispersed above said section by rotating bladed rotor means about a substantially vertical axis and in overlying proximity to said section, discharging treatment particles into the air being so displaced for dispersal thereby, and controlling rotor blade angularity with respect to said axis thereby producing a selected transverse flow pattern of vertically displaced air flow and said particles therein and heating lengthwise extent of said bladed rotor means so that said bladed rotor means radiates heat toward said section of the earth.

References Cited in the file of this patent

UNITED STATES PATENTS

| | | |
|---|---|---|
| 1,993,635 | Towt | Mar. 5, 1935 |
| 2,232,728 | Pleasants | Feb. 25, 1941 |
| 2,335,281 | Jepson | Nov. 30, 1943 |
| 2,653,655 | Salmon | Sept. 29, 1953 |
| 2,895,259 | Beckett | July 21, 1959 |
| 2,954,932 | Albano | Oct. 4, 1960 |
| 2,964,247 | Maasdam | Dec. 13, 1960 |

FOREIGN PATENTS

| | | |
|---|---|---|
| 14,309 | Australia | of 1923 |
| 201,574 | Great Britain | Oct. 30, 1924 |

OTHER REFERENCES

Evening Star (Washington, D.C., newspaper), published Wednesday, April 8, 1959, page A–5, article "Plastic Smoke Clouds May Aid Space Study," by W. Hines.